No. 709,194. Patented Sept. 16, 1902.
G. M. BENNETT.
FRICTION CLUTCH.
(Application filed July 13, 1901.)
(No Model.)
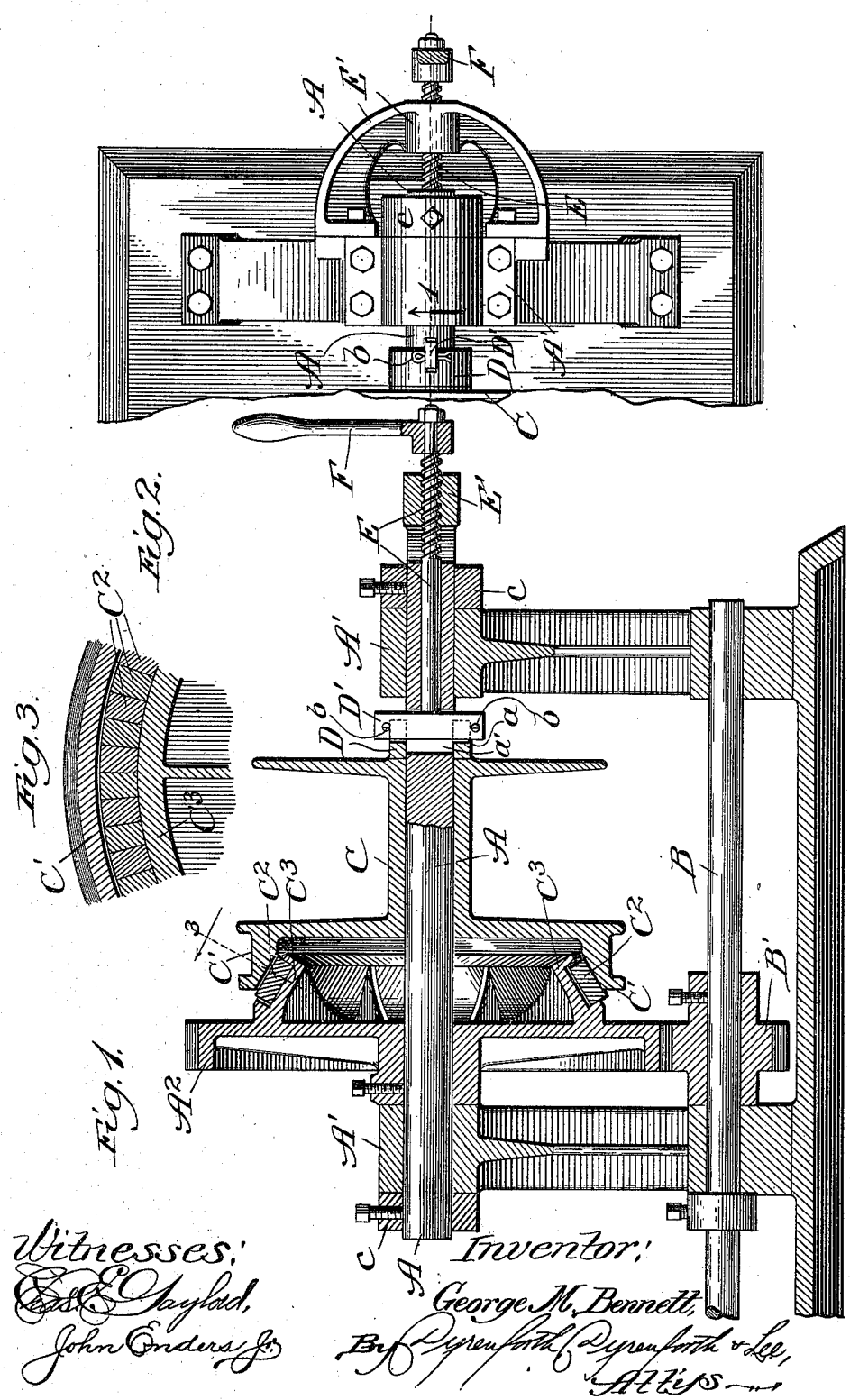
Witnesses:
Inventor:
George M. Bennett

UNITED STATES PATENT OFFICE.

GEORGE M. BENNETT, OF KENOSHA, WISCONSIN, ASSIGNOR OF ONE-HALF TO THOMAS FORGHAM, OF KENOSHA, WISCONSIN.

FRICTION-CLUTCH.

SPECIFICATION forming part of Letters Patent No. 709,194, dated September 16, 1902.

Application filed July 13, 1901. Serial No. 68,198. (No model.)

*To all whom it may concern:*

Be it known that I, GEORGE M. BENNETT, a citizen of the United States, residing at Kenosha, in the county of Kenosha and State of Wisconsin, have invented new and useful Improvements in Friction-Clutches, of which the following is a specification.

This invention relates particularly to clutches in which motion is imparted from a driving member to a driven member by means of friction between the two members, one of the members being capable of a shifting movement for the purpose of producing the frictional engagement.

The primary object of the invention is to provide a clutch of this nature better adapted to this purpose than any heretofore used.

The invention is illustrated in its preferred form in the accompanying drawings, in which—

Figure 1 represents a sectional view showing the device applied as the driving means of a hoisting-drum, the section being taken as indicated at line 1 of Fig. 2; Fig. 2, a broken plan section illustrating the manner of shifting the drum to produce the frictional engagement, and Fig. 3 an enlarged broken section taken as indicated at line 3 of Fig. 1.

The preferred construction is as follows:

A represents a shaft journaled in bearings A′ and equipped with a rigidly-fixed gear $A^2$; B, a shaft to which power is applied, the same being equipped with a pinion B′, meshing with the gear $A^2$; C, a hoisting-drum loosely journaled on the shaft A and provided with a bell-shaped friction-wheel C′, which serves to engage friction material $C^2$, confined between the bell-shaped periphery of the wheel C′ and a conical projection $C^3$, with which the gear $A^2$ is provided; D, a shiftable collar on the shaft A, the same being provided with slots $a$, which register with the slots $a'$ in the shaft A; D′, a key connecting the collar D to the shaft A, the same being held in place by means of cotter-pins $b$; E, a screw having threaded connection with a head E′, attached to the bearing A′, said screw having a smooth inner end, which extends into a central longitudinal opening with which the shaft A is provided and bears against the block or key D′, and F a handle through the medium of which the screw E is turned.

The friction material $C^2$ is preferably compressed wood fiber and comprises an annular row of blocks located in a peripheral recess with which the cone $C^3$ is provided. The shaft A is confined against longitudinal movement by means of collars $c$, fixed thereon and located adjacent to the bearings A′.

As illustrated, the blocks comprising the hollow conical ring $C^2$ fit loosely between the cone $C^3$ and the bell C′. The gear $A^2$ and the shaft A are in operation kept running constantly. When it is desired to use the drum, the handle F is turned in a direction to force the screw inwardly, and thereby to clamp the drum between the collar D and the cone $C^3$. When this occurs, it will be observed, frictional engagement will take place between the blocks constituting the ring $C^2$ and the bell C′ and also between said blocks and the cone $C^3$. When it is desired to release the drum, this is done by a reverse movement of the handle F.

It has been found by actual trial that when a loose sectional collar is employed between the bell and cone in the manner set forth the wear upon the blocks is reduced to a minimum and, moreover, is equally distributed over the outer and inner surfaces of the blocks, so that no shoulder is produced upon the blocks. It is notable also that when the release occurs, since there is slippage at the two conical surfaces, the loosening effect is immediate and is easily accomplished. As a matter of fact, it is found to be unnecessary to employ a spring or other such expedient for separating the parts, and accidental sticking or binding is avoided wholly.

It will be understood that the improved clutch is applicable to other situations than that in connection with a hoisting-drum. The appended claims are intended, therefore, to cover the clutch for any purpose to which it can be usefully applied. Moreover, as will be understood readily, the shape of the bell may be varied and more than one sectional ring of frictional material employed in the same clutch, if desired.

What is claimed as new is—

1. The combination of a driving member and a driven member, one of said members being provided with a cone and the other with a bell for receiving said cone, a sectional collar loosely supported between said bell and cone and means for shifting one of said first-named members to press the sectional collar into engagement with the other member to produce frictional engagement between said collar and both said members, substantially as described.

2. In a friction-clutch, the combination of a driving member and a driven member, one of said members being provided with a cone and the other with a bell for receiving said cone, a peripheral channel being provided between said cone and bell, blocks of friction material loosely supported within said channel, and means for shifting one of said members to produce frictional engagement, substantially as described.

3. In a friction-clutch, the combination of a driving member and a driven member, one of said members being shiftable, a loose collar comprising blocks of friction material supported between said first-named members, and means for shifting said shiftable member, thereby to produce friction between both said first-named members and said sectional collar, for the purpose set forth.

GEORGE M. BENNETT.

In presence of—
ALBERT D. BACCI,
WM. B. DAVIES.